June 13, 1972        F. P. NEBEL        3,669,604
APPARATUS FOR PROCESSING FLOWABLE PARTICULATE SOLID MATERIAL
Filed May 19, 1970        2 Sheets-Sheet 1
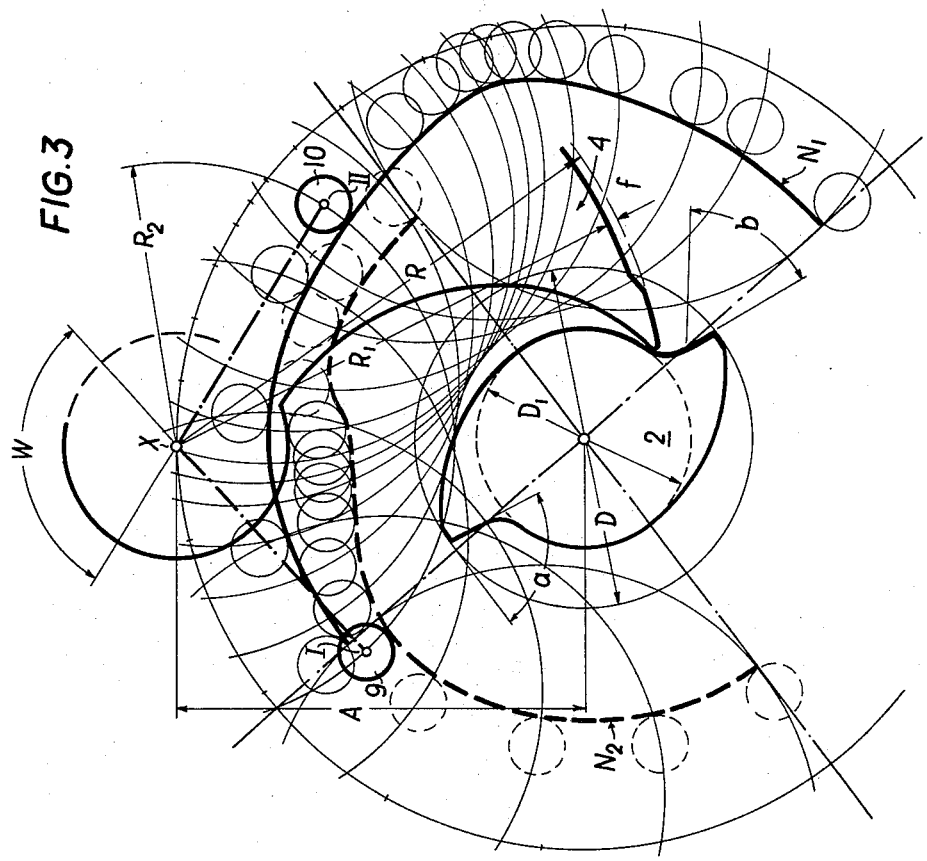
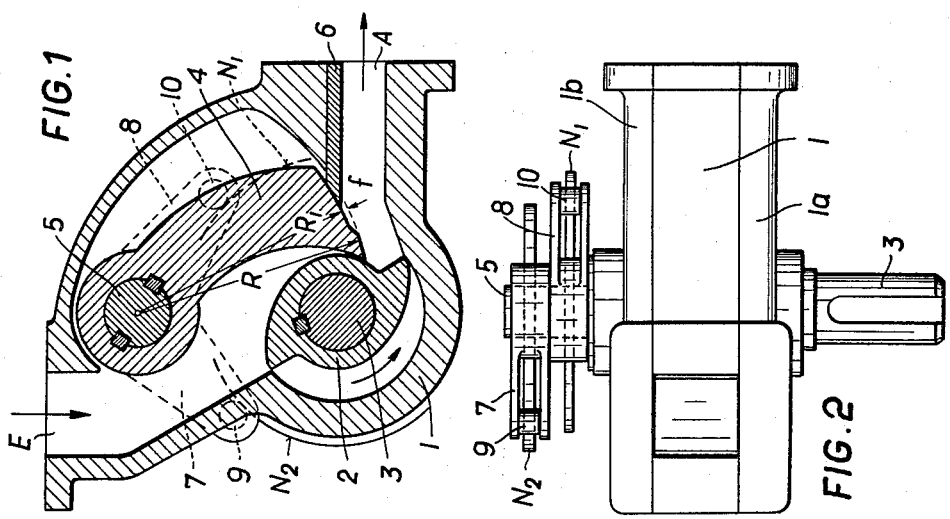
INVENTOR:
FRANZ P. NEBEL
BY
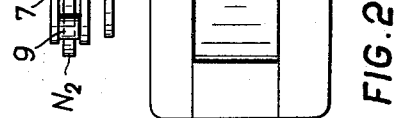
ATTORNEY

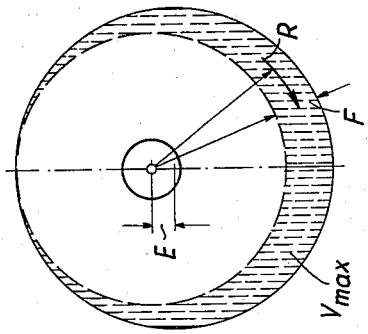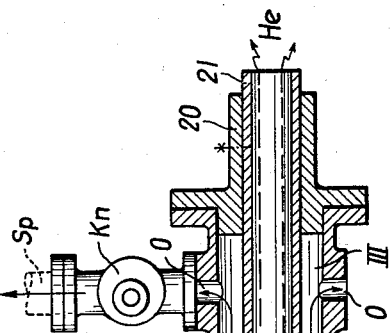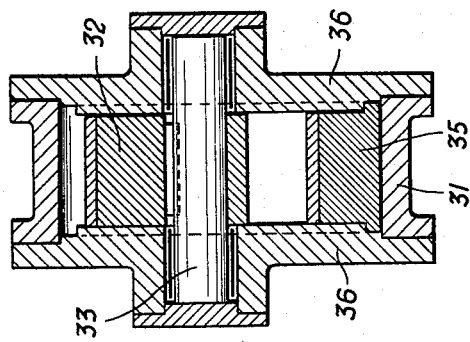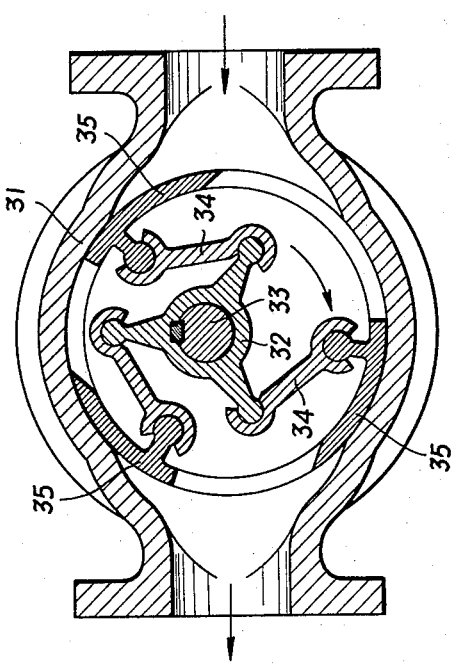

United States Patent Office 3,669,604
Patented June 13, 1972

3,669,604
APPARATUS FOR PROCESSING FLOWABLE
PARTICULATE SOLID MATERIAL
Franz P. Nebel, Muhlberg 11,
A5132 Geretsberg, Austria
Filed May 19, 1970, Ser. No. 38,688
Claims priority, application Germany, May 23, 1969,
P 19 26 371.9
Int. Cl. B29f 3/06
U.S. Cl. 425—379                                4 Claims

ABSTRACT OF THE DISCLOSURE

A heatable duct defines a passage of annular cross-section. A rotary piston feeder has an outlet connected to said passage. Said feeder is operable to force said material through said passage. Shaping means are arranged to receive said material from said passage and to shape said material.

---

This invention relates to apparatus which may be used within a very wide field, for instance as a rotary piston extruder for the production of slabs, beams, bricks etc. for use in the building industry from various materials, and for processing ceramic compositions to form products used in electrical engineering, etc. The invention is of special significance in the plastic industry because the same apparatus may be used to process different kinds of plastic materials that require different treatments to form the desired products.

Depending on the specific function to be performed, the known apparatus used for the purposes outlined above comprise screws as essential machine elements or consist of hydraulic presses. It is known in the art that such apparatus do not meet all requirements from the technical and economic aspects.

Depending on the function to be performed, the apparatus according to the invention comprises as main components a rotary piston feeder, an extrusion die assembly for producing varicus extruded products, a heatable gelling duct for processing plastic materials, and a kneading and homogenizing machine.

An embodiment of apparatus according to the invention will now be described more fully by way of example with reference to the drawing, in which FIGS. 1 and 2 are, respectively, a sectional view and a top plan view showing a rotary piston press.

FIG. 3 is a development of the cams.

FIGS. 4 and 5 are sectional views showing the kneading and homogenizing machine.

FIG. 6 shows the maximum throughput rate of the latter machine.

FIG. 7 is a diagrammatic view showing the overall apparatus for processing plastic materials.

The rotary piston feeder shown in FIGS. 1 and 2 comprises a housing 1 having end covers 1a and 1b, a rotary piston 2, a rotary piston shaft 3, a hinged backed vane 4 fixed to a vane shaft 5, and a scraper 6. The vane 4 is positively controlled by the shaft 5, the levers 7 and 8 and the cam follower rollers 9 and 10 carried by said levers. Cam faces $N_1$ and $N_2$ are fixedly mounted on shaft 5 and rotate therewith as shown in FIG. 2.

Rotary piston machines are known which comprise a rotary piston and a backed vane but these known machines do not accomplish the object underlying the invention to enable a satisfactory compacting and processing of dry or almost dry bulk material under pressures in excess of 1000 kilograms per square centimeter.

To accomplish the object mentioned above, the rotary piston must have such a contour that the angle between the pressure-exerting surface of the piston lobe and the inside surface of the housing (angle $a$ in FIG. 3) and the angle between the pressure-exerting surface of the piston lobe and the end face of the vane (angle $b$ in FIG. 3) are so large that substantially no trouble in operation due to a wedging action can arise even under very high pressure.

It has been necessary to provide such a device because the free end of the backed vane must adjust itself for a uniform sealing contact with all portions of the periphery of the piston, which has a lobe having a cornered apex. Further, the required oscillation of the vane can be performed only by a positive control device that has rounded control cams.

FIG. 3 illustrates the solution to that problem and the design of the cams. It is apparent from FIG. 3 that the dimensions of the movable elements must also have approximately a predetermined ratio, namely:

The radius R of the backed vane is 1.2 times the distance A from the center of the rotary piston to the pivotal axis X of the vane.

The ratio of the larger diameter D of the rotary piston to the smaller diameter $D_1$ thereof is 1.5:1.

The ratio of the distance $R_2$ from the pivotal axis X to the centers I and II of the cam follower rollers to the radius R of the vane is 1:1.7. The angle W between the cam follower levers is 110°. The diameter of the cam follower rollers 9 and 10 in FIG. 1 is one-fifth of $R_2$.

The above-mentioned dimensional relations must not be departed from by more than small amounts. This is required if a kinematic arrangement is to be obtained in which the cam face $N_1$ that is shown in a thick line in FIG. 3 and that imparts an outward movement to the vane, and the cam face $N_2$ that is shown in a dotted line and that imparts an inward movement to the vane, are suitably rounded throughout their extent to ensure an even and reliable rolling contact of the cam follower rollers with said cams even though the latter positively control the vane to adjust itself to the periphery of the rotary piston that has sharp-edged corners.

Due to the difference between the radius R (FIG. 3) and the radius $R_1$ (FIG. 1) of the vane, the latter has an effective pressure surface $f$ promoting an inward movement of the vane. In order to prevent excessive clearances between the vane and the rotary piston particularly when high pressures are used—such excessive clearances may be due to bearing clearances—the pressurized material to be compacted acts constantly on the surface $f$ so that any bearing clearance will be rendered ineffective.

As shown in FIG. 7, the gelling duct required according to the invention is composed of an adapter 17 having a free cross-section which changes from a polygonal to a circular configuration, a conically flaring pipe 18, an outer tube 19, and an inner tube 21 fixed to a cover 20. The pipe 18 and the outer tube 19 are heated from the outside by heaters H and Ha and the inner tube 21 is heated by a heater Hi having a connection He.

The homogenizing machine shown in FIGS. 4 and 5 consists of a rotary piston machine which operates as a motor and consists mainly of a housing 31, a rotor 32 having a shaft 33, shoelike rotor vanes 35 linked to the rotor 32 by links 34, and end covers 36.

The rotor 32 and the shaft 33 are eccentrically mounted relative to the housing. If the previously gelled material to be processed is forced into the housing in the direction of the arrow, said material will exert a torque on the machine elements and the shaft. The shoelike rotor vanes are positively guided by grooves formed in the covers 36. The joints connecting the rotor and the rotor vanes are partly open so that the rotor, links and piston can be inserted in a simple manner when only one cover is removed.

Only an amount V max. (represented by the vertically hatched area in FIG. 6) passes through the machine during each revolution.

Mode of operation:

With reference to FIG. 7, plastic material (polyvinylchloride) in the form of a powder or granules, is charged into the feeder P and is forced through the pipes 17 and 18 and then through the outer tube 19. The inner tube disposed in the outer tube defines an annular free cross-section with the outer tube. During the slow transfer of the plastic material through the annular passage G, the heating shells H, H$a$ and the inner heater H$i$ gradually cause the plastic material to gel. If the passage is of an appropriate length, the outer and inner heating elements associated with the gelling duct will accomplish the desired gelling at temperatures which can easily be controlled and there is no danger of an overheating of the plastic material.

The adapter 17, which is not heated, increases in cross-section in the direction of flow so that arching is avoided which would result in a friction which cannot be overcome. The same remark is applicable to the annular cross-section in the conical pipe 18 in which the heating begins. The length of the gelling duct is selected so that the plastic material has a viscous consistency throughout at III. For a thorough homogenization, the viscous plastic material is forced through one homogenizing machine or through a plurality of homogenizing machines, which are connected in series. The amount transferred through the homogenizing machine per revolution thereof is suitably selected to be smaller than the amount delivered by the feeder P per revolution thereof so that the speed of the homogenizing machine is higher than that of the feeder P. Only part of the material (this part is represented by the area V max. in FIG. 6) is transferred in the direction of flow through the homogenizing machine. Another part is circulated in the housing and continually made up. This other part is shown in FIG. 4 between the handling element in the upper half of the orbit. This operation results in a thorough mixing and kneading action, which may be intensified if the eccentricity E (shown in FIG. 6) is reduced because in that case the speed will be increased when a predetermined amount has been transferred so that an even thorougher homogenization will be effected. A plurality of homogenizing machines may be connected in series. The extrusion die assembly S$p$ is connected to the homogenizing machine K$n$.

The duct G may be provided at III with a plurality of outlet openings O, which are connected to any desired extrusion die assemblies or molds. In this way, the capacity of a plant may be increased. All resistances which are to be overcome during the processing are easily overcome by the rotary piston feeder. The annular cross-section of the passage of the gelling duct is dimensioned so that the material flows so slowly through said duct that the resulting frictional heat is virtually negligible compared to the operation of the known screw feeders.

The apparatus according to the invention affords both technical and important economical advantages because the capital requirement and maintenance costs are only a fraction of those of conventional plants having only a limited field of application.

I claim:

1. apparatus for processing flowable particulate solid material, comprising
   a heatable duct defining a passage of annular cross section, said duct includes an outer tube and an inner tube forming said passage, heating means being disposed outside said outer tube and inside said inner tube,
   a rotary piston feeder having an outlet connected to said passage, said feeder being operable to force said material through said passage, said feeder including a housing, a rotary piston rotatably mounted in said housing, and a backed vane mounted in said housing and having a free end face in sealing contact with the periphery of said piston, said rotary piston including a lobe, which has a pressure-exerting surface terminating at an apex edge and including a first angle with the inside surface of said housing, and a second angle with the free end face of said vane, said first and second angles being sufficiently large to avoid a wedging action, and shaping means that include at least one extrusion die assembly arranged to receive said material from said passage and to shape said material.

2. Apparatus as set forth in claim 1, in which
   said vane is movably mounted in said housing and
   a mechanism comprising rounded cams is provided to positively control said vane so that said free end face is maintained in contact with the periphery of said rotary piston.

3. Apparatus as set forth in claim 2, in which
   said vane is pivoted on a pivotal axis,
   said rotary piston has a larger diameter and a smaller diameter,
   said mechanism comprises cam follower levers connected to said vane and pivoted on said pivotal axis and carrying cam follower rollers in contact with said cam faces,
   said vane has a radius which is approximately 1.2 times the distance from the center of the rotary piston to said pivotal axis,
   the ratio of said larger diameter to said smaller diameter is approximately 1.5:1,
   the ratio of the distance from said pivotal axis to each of the centers of said cam follower rollers to the radius of the vane is approximately 1:1.7,
   the cam follower rollers include an angle of approximately 110°, and
   the diameter of the cam follower rollers is approximately one-fifth of the distance from said pivotal axis to each of the centers of said cam follower rollers.

4. Apparatus as set forth in claim 1, in which
   said free end face is stepped to provide a surface adapted to be acted upon by pressure in an inward direction.

References Cited

UNITED STATES PATENTS 3,178,769  4/1965  Lorenian _____ 18—30 FM X
2,667,289  1/1954  Daniels _____ 222—342 X J. SPENCER OVERHOLSER, Primary Examiner N. E. LEHRER, Assistant Examiner U.S. Cl. X.R.

425—205